United States Patent Office 3,427,316
Patented Feb. 11, 1969

3,427,316
QUATERNARY AMMONIUM HYDROXAMATES
Reginald L. Wakeman, Philadelphia, Pa., and Joseph F. Coates, Washington, D.C., assignors to Millmaster-Onyx Corporation, Jersey City, N.J., a corporation of New York
No Drawing. Continuation-in-part of application Ser. No. 375,952, June 17, 1964. This application May 2, 1966, Ser. No. 546,575
U.S. Cl. 260—286   5 Claims
Int. Cl. C07c 103/54, 103/30; A61k 27/00

ABSTRACT OF THE DISCLOSURE

A microbiocidal quaternary ammonium hydroxamate having the structure:

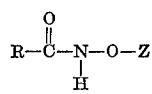

wherein R is an aliphatic or aromatic group having 5–21 carbon atoms and Z is the cation of a microbiocidal quaternary ammonium compound having at least one alkyl of 8–22 carbon atoms and an aryl group attached to the quaternary nitrogen and having a phenol coefficient of at least 100 with respect to *Staphylococcus aureus* and *Salmonella tpyhosa* at 20° C.

---

This invention relates to microbiologically active quaternary ammonium compounds, and it more particularly relates to quaternary amonium hydroxamates.

This application is a continuation-in-part of co-pending application Ser. No. 375,952, filed June 17, 1964 now abandoned.

The products of this invention conform, in general, with the following structure:

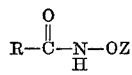

wherein R is an aliphatic or aromatic radical having from 5 to 21 carbon atoms and Z is the cation of a microbiologically active quaternary ammonium wherein there is at least one alkyl and an aryl group attached to the nitrogen, at least one alkyl group attached to the nitrogen having from 8 to 22 carbon atoms.

The preparation of hydroxamic acids is known to the art and may consist of reacting hydroxylamine or its salts with esters, amides or anhydrides of carboxylic acids. Typical examples of these hydroxamic acids are benzhydroxamic, hydroxybenzhydroxamic, dichlorobenzyhydroxamic, sorbichydroxamic, laurylhydroxamic, undecylhydroxamic, oleylhydroxamic, stearylhydroxamic and the like. Certain hydroxamic acids are articles of commerce.

In general, we prefer to use such quaternary ammonium compounds which have a phenol coefficient of at least 100 with respect to both *Staphylococcus aureus* and *Salmonella typhosa* at 20° C. when determined by the standard method given in the "Official Methods of Analysis of the Association of Official Agricultural Chemists," ninth edition (1960), page 63 et seq.

The compounds of this invention may be prapared by mixing aqueous solutions of the quaternary ammonium hydroxides or salts with an aqueous solution of the hydroxamic acid in question or any of its water-soluble salts.

After thorough mixing, the organic product layer is separated from the aqueous layer (as with a separatory funnel) since two distinct phases are formed. Separation may be facilitated by the addition of an organic solvent immiscible with water. The product layer may be washed with water to remove any residual by-product or unreacted materials. The solvent, if any, may be evaporated and the product air or vacuum dried to a paste, wax, oil or solid.

It is not necessary to use an aqueous medium. Any solvent or solvent mixture in which the starting materials are soluble will be satisfactory. Non-aqueous solvents facilitate the separation of by-product inorganic salt and reduce the need for vacuum drying to get an anhydrous product. When a non-aqueous medium is employed, it is usually necessary to add a small amount of water to facilitate ionic reaction.

The product may be used, if desired, without drying since any entrapped water is irrelevant to the microbiological activity of the compounds. In other applications, removal of water may be essential for reasons not related to biological activity.

An alternative method for the preparation of compounds especially applicable to the treatment of fabric, ropes, net woven and non-woven fabric and reticulted or convoluted materials involves a two-step process. In the first step, the material is passed through a bath containing the anionic moiety. Excess solution is removed by methods well known to those skilled in the art. The treated material is then passed through a second bath wherein the concentration of quaternary ammonium compound is such that the material pickup will result in an equivalent amount of quaternary ammonium compound reacting with the anionic moiety, depositing the product in the most intimate way on the surface and in the interstices, convolutions and reticulations of the material.

The method of adjustment of solution concentration to achieve the required pickup is well known to those skilled in the art. The order of treatment may be reversed without affecting the biological activity or durability of the product on the material. The products of this invention may be formulated as water dispersons by dissolving them in a water miscible organic solvent such as acetone or methanol and diluting with water or by dissolving them in emulsifiable oils such, for example, as sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiological activity despite their relative insolubility in water. Because of their unusual combination of phyiscal and microbiological properties, they can be used to impart laundry-resistant anti-microbial characteristics to textiles. They can also be used as the active agent in antimildew finishes for textiles which are resistant to leaching with water.

Although the compounds have low water solubility, they are compatible with various organic solvents, plasticizers and high molecular weight compounds. Consequently, they may be incorporated as anti-microbial agents in synthetic resins and plastics. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents. In such compositions they retain their microbiological activity.

It will be understood that the properties of the products described herein will vary depending upon the nature of the cationic quaternary ammonium compound used in their preparation as well as the anionic compound reacted therewith.

The chemical, physical and biological properties of the products of our invention make them especially appropriate for the following applications when suitably incorporated in active amounts in an appropriate vehicle, binder, medium or substrate:

(1) Mildewproofing fabric, canvas, ropes, textiles, awnings, sails, tenting and other woven and non-woven reticulated materials.
(2) Paint mildewstats.
(3) Jet plain fuel additive to control growth of microorganisms.
(4) Odor preservative agents for clothes and shoes.
(5) Mildew retardant and odor suppressant for shoes and other leather products.
(6) Topical antiseptics.
(7) Antidandruff agents.
(8) Disinfection agents for hair and gut of man and beast.
(9) Bacteriostatic furniture dressing.
(10) Surface finishes for stone, plaster, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage.
(17) Contact biostat for application to film, waxes and cloth to preserve cheese, meats and vegetables and other food products.
(18) Algal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.
(24) Preservation of metal-working compounds.
(25) Additives for soap and for both anionic and nonionic detergents in liquid, bar, powder, bead, solution and other forms to impart bacteriostatic and fungistatic properties thereto.
(26) Bacteriostatic agents for household laundry softeners.
(27) Algastat and bacteriostat in recirculated water for cooling towers, air conditioners and humidifiers.
(28) Bacteriostat and algastat for flood waters and brines used in secondary oil recovery.
(29) Fungistat for seed and soil treatment against damping-off.

The microbiological activity of our compounds has been evaluated for microbiological stasis by the Standard Tube Dilution Test, the technique for which is common knowledge to those skilled in the art. A Difco Bacto CSMA Broth #0826 was used in the study. This test is used to determine the lowest concentration of microbiologically active compounds which will inhibit the growth of the organism in question. For a wide range of applications, the inhibition of growth rather than outright kill is satisfactory.

Briefly put, the Tube Dilution Test consists in placing 9 cc. of the CSMA Broth in a test tube which is then sterilized in an autoclave. One cc. of a solution of the microbiologically active compound at an appropriate concentration is added to the test tube which is then inoculated with 0.1 cc. of a twenty-four hour old culture of the organism under study. The test tube is then incubated at 37° C. for forty-eight hours and observed for bacterial growth.

The same procedure is followed for fungi. In such tests, however, the tubes are incubated for fourteen days at a temperature suitable for optimum fungal growth, usually 25° C.

This invention is illustrated by, but not restricted to, the following examples:

Example I

A stock solution of sodium oleylhydroxamate was prepared in water at 5% concentration by weight.

An aliquot of this solution containing 0.0173 molecular weights of the compound was agitated vigorously while adding a chemically equivalent amount of a 10% solution of a commercial grade of alkyl dimethyl ethyl-benzyl ammonium chloride (Onyx Chemical Corporation's "BTC-471" in which the alkyl distribution is 50% $C_{12}$, 30% $C_{14}$, 17% $C_{16}$, 3% $C_{18}$). The reaction mixture, along with a little benzene, was transferred to a separatory funnel in which it separated into two phases. The organic product layer was removed and vacuum dried to yield 100% of the theoretical amount of alkyl dimethyl ethyl-benzyl ammonium oleylhydroxamate as a yellow paste.

Example II

An aliquot of the stock solution of sodium oleylhydroxamate of Example I was reacted in the same manner with a chemically equivalent amount of a 10% solution of a commercial grade of alkyl dimethyl benzyl ammonium chloride (Onyx Chemical Corporation's "BTC-824" in which the alkyl distribution is 60% $C_{14}$, 30% $C_{16}$, 5% $C_{12}$, 5% $C_{18}$). The product, alkyl dimethyl benzyl ammonium oleylhydroxamate, was recovered in the theoretical yield as a yellow paste.

Example III

An aliquot of the stock solution of sodium oleylhydroxamate of Example I containing 0.018 molecular weights of the compound was reacted in the same way with a chemically equivalent amount of an aqueous-alcohol solution of a commercial grade of alkyl isoquinolinium bromide (Onyx Chemical Corporation's "Isothan Q-75" in which the alkyl distribution is 50% $C_{12}$, 30% $C_{14}$, 17% $C_{16}$, 3% $C_{18}$). Benzene was added and the organic product layer was removed and dried in air to yield the theoretical amount of alkyl isoquinolinium oleylhydroxamate as a dark brown paste.

Example IV

A mixture of alkylhydroxamic acids consisting mainly of palmitylhydroxamic and stearylhydroxamic acids with a combining weight of 295 was dissolved in a stoichiometric quantity of sodium hydroxide solution and diluted to 5% concentration by weight.

An aliquot of this solution containing 0.019 molecular weights of the compound was reacted with a chemically equivalent amount of the alkyl dimethyl ethyl-benzyl ammonium chloride of Example I and in the same manner. A light brown paste of alkyl dimethyl ethyl-benzyl ammonium higher alkylhydroxamate was obtained in 93% of the theoretical yield.

Example V

An aliquot of the stock solution of the sodium palmityl-stearyl hydroxamic acids of Example IV was reacted similarly with a chemically equivalent amount of the alkyl dimethyl benzyl ammonium chloride of Example II. The product, alkyl dimethyl benzyl ammonium higher alkylhydroxamate, was obtained in substantially theoretical yield as a light brown paste.

Example VI

Similarly, on reacting an aliquot of the stock solution of sodium palmityl-stearyl hydroxamate of Example IV with a chemically equivalent amount of the alkyl isoquinolinium bromide fo Example III, a dark brown paste of alkyl isoquinolinium higher alkylhydroxamate was obtained in substantially the theoretical yield.

Example VII

Potassium sorbichydroxamate was dissolved to make a 10% stock solution.

An aliquot of this solution containing 0.0364 molecular weights of the compound was reacted with a chemically equivalent amount of the alkyl dimethyl ethyl-benzyl ammonium chloride of Example I and in the same manner. Alkyl dimethyl ethyl-benzyl ammonium sorbichydroxamate was obtained in 86% of the theoretical yield as an orange paste.

Example VIII

An aliquot of the solution of potassium sorbichydroxamate of Example VII was reacted similarly with a chemically equivalent amount of the alkyl dimethyl benzyl ammonium chloride of Example II. Alkyl dimethyl benzyl ammonium sorbichydroxamate was recovered in 96% of the theoretical yield as a viscous orange liquid.

Example IX

An aliquot of the solution of potassium sorbichydroxamate of Example VII was reacted in the same manner with a chemically equivalent amount of the alkyl isoquinolinium bromide of Example III. Alkyl isoquinolinium sorbichydroxamate was recovered as a dark brown paste in 99% of the theoretical yield.

Example X

The dipotassium salt of p-hydroxybenzhydroxamic acid was prepared in 5% aqueous solution.

An aliquot containing 0.065 molecular weights of the compound was reacted with two chemical equivalents of the alkyl dimethyl ethyl-benzyl ammonium chloride of Example I and in the same manner. Di-(alkyl dimethyl ethyl-benzyl ammonium) p-hydroxybenzhydroxamate was recovered as a dark brown paste in substantially the theoretical yield.

Example XI

On reacting 0.065 molecular weights of the stock solution of dipotassium p-hydroxybenzhydroxamic acid of Example X with two chemical equivalents of the alkyl dimethyl benzyl ammonium chloride of Example II, di-(alkyl dimethyl benzyl ammonium) p-hydroxybenzyhydroxamate was obtained in 75% of the theoretical yield.

Example XII

Similarly, reacting the solution of dipotassium p-hydroxybenzhydroxamate of Example X with two chemical equivalents of the alkyl isoquinolinium bromide of Example III produced di-(alkyl isoquinolinium) p-hydroxybenzhydroxamate as a reddish brown paste in substantially the theoretical yield.

Example XIII

Potassium undecylhydroxamate was dissolved in a mixture of isopropanol and water to make a 1% solution.

An aliquot of this solution containing 0.0253 molecular weights of the compound was reacted with a chemically equivalent amount of the alkyl dimethyl ethyl-benzyl ammonium chloride of Example I.

After evaporating off the alcohol and adding benzene, the mixture was separated in a separatory funnel and the organic product layer was removed and dried. Alkyl dimethyl ethyl-benzyl ammonium undecylhydroxamate was recovered in the theoretical yield as a viscous yellow liquid.

Example XIV

Using the same technique, reacting the potassium undecylhydroxamate of Example XIII with the alkyl dimethyl benzyl ammonium chloride of Example II yielded 88% of the theoretical amount of alkyl dimethyl benzyl ammonium undecylhydroxamate as a light yellow paste.

Example XV

Similarly, reacting the potassium undecylhydroxamate of Example XIII and the alkyl isoquinolinium bromide of Example III produced the theoretical amount of alkyl isoquinolinium undecylhydroxamate as a deep red, viscous liquid.

Example XVI

When tested by the Standard Tube Dilution Method described above, these products gave the following values for static dilution (S.a.=$Staphylococcus\ aureus$; S.t.=$Salmonella\ typhosa$; A.n.=$Aspergillus\ niger$):

| Product of example | Reciprocal of static dilution vs.: | | |
|---|---|---|---|
| | S.a. | S.t. | A.n. |
| I | $10^7$ | $10^6$ | >$10^6$ |
| II | $10^6$ | $10^5$ | >$10^6$ |
| III | <$10^5$ | $10^4$ | $10^5$ |
| IV | >$10^5$ | $10^5$ | $10^4$ |
| V | $10^6$ | $10^6$ | $10^4$ |
| VI | $10^5$ | $10^4$ | $10^3$ |
| VII | $10^6$ | $10^5$ | $10^4$ |
| VIII | $10^5$ | $10^5$ | $10^4$ |
| IX | $10^6$ | $10^5$ | $10^4$ |
| X | $10^5$ | $10^4$ | $10^4$ |
| XI | $10^6$ | $10^5$ | $10^4$ |
| XII | $10^5$ | $10^4$ | $10^4$ |
| XIII | $10^5$ | $10^7$ | $10^4$ |
| XIV | $10^5$ | $10^5$ | $10^3$ |
| XV | $10^5$ | $10^4$ | $10^4$ |

Obviously, many modifications and variations of the present invention are possible in the light of the above teachings.

The invention claimed is:

1. A quaternary ammonium compound having the structure:

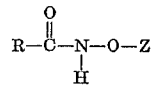

wherein R has from 5 to 21 carbon atoms and is a member of the group consisting of alkyl, alkenyl, benz, hydroxybenz and halobenz, and wherein Z is a quaternary ammonium cation selected from the group consisting of alkyl dimethyl benzyl ammonium, alkyl dimethyl ethyl-benzyl ammonium and alkyl isoquinolinium.

2. The compound of claim 1 wherein RCO is oleyl.
3. The compound of claim 1 wherein RCO is sorbic.
4. The compound of claim 1 wherein RCO is p-hydroxybenz.
5. The compound of claim 11 wherein RCO is undecyl.

References Cited

UNITED STATES PATENTS

| | | | |
|---|---|---|---|
| 2,397,508 | 4/1946 | Rovault et al. | 260—500 |
| 2,548,218 | 2/1951 | Shaw et al. | 260—289 XR |
| 2,700,683 | 1/1955 | Tesoro et al. | 260—567.6 |
| 2,700,684 | 1/1955 | Tesoro et al. | 260—567.6 |
| 3,060,177 | 10/1962 | Druey et al. | 260—294 |
| 3,223,704 | 12/1965 | Shibe et al. | 260—286 |
| 3,277,097 | 10/1966 | Wakeman et al. | 260—286 |

OTHER REFERENCES

Schwartz et al.: "Surface Active Agents," vol. II, Interscience 1958, p. 222 relied on.

Burger: Medicinal Chemistry, 2nd ed., Academic Press, 1960, p. 978 relied on.

ALEX MAZEL, *Primary Examiner.*

D. G. DAUS, *Assistant Examiner.*

U.S. Cl. X.R.

8—116.2, 128; 99—222, 161; 106—3, 15; 117—138.5; 252—8.55, 8.57, 50, 177; 260—404, 404.5, 501.15, 567.6, 999